United States Patent [19]

Takahashi et al.

[11] Patent Number: 4,467,447
[45] Date of Patent: Aug. 21, 1984

[54] INFORMATION TRANSFERRING APPARATUS

[75] Inventors: Toshiya Takahashi; Yoshikuni Sato, both of Tokyo, Japan

[73] Assignee: Nippon Electric Co., Ltd., Tokyo, Japan

[21] Appl. No.: 319,016

[22] Filed: Nov. 6, 1981

[30] Foreign Application Priority Data

Nov. 6, 1980 [JP] Japan .............................. 55-156352

[51] Int. Cl.³ .............................................. G06F 1/04
[52] U.S. Cl. ................................................... 364/900
[58] Field of Search ................................. 364/200, 900

[56] References Cited

U.S. PATENT DOCUMENTS 4,050,096 9/1977 Bennett et al. ...................... 364/200

OTHER PUBLICATIONS

"Complex Systems are Simple to Design", LeMair, Sep. 1, 1978, Electronic Design.

Primary Examiner—Gareth D. Shaw
Assistant Examiner—Tim A. Wiens
Attorney, Agent, or Firm—Sughrue, Mion, Zinn, Macpeak, and Seas

[57] ABSTRACT

A data processing system including a central processing unit (CPU), a memory device operating on a data word length of 2 m-bits, an input/output device operating on a data word length of m bits, an m-bit register and a direct memory access (DMA) controller for transferring data words in both directions between the memory device and the input/output device independently of the CPU. A 2 m-bit bus is connected between the memory device and two m-bit buses connected to a bus switching circuit which controls the transfer of m-bit data words between the 2 m-bit bus and the register and the input/output device. A control circuit generates timing and switching signals such that, during a first bus cycle a first m-bit data word from the input/ouput device is stored in the register, and during a second bus cycle a second m-bit data word from the input/output device is transferred directly via the buses to the memory device and, also, the first m-bit data word, stored in the register, is transferred to the memory device. For transfer of a data word from the memory device to the input/output device, during a first bus cycle m bits of data are transferred directly via the buses to the input-/output device and, also, the following m bits are stored in the register, and during a second bus cycle the following m bits are transferred to the input/output device.

6 Claims, 8 Drawing Figures

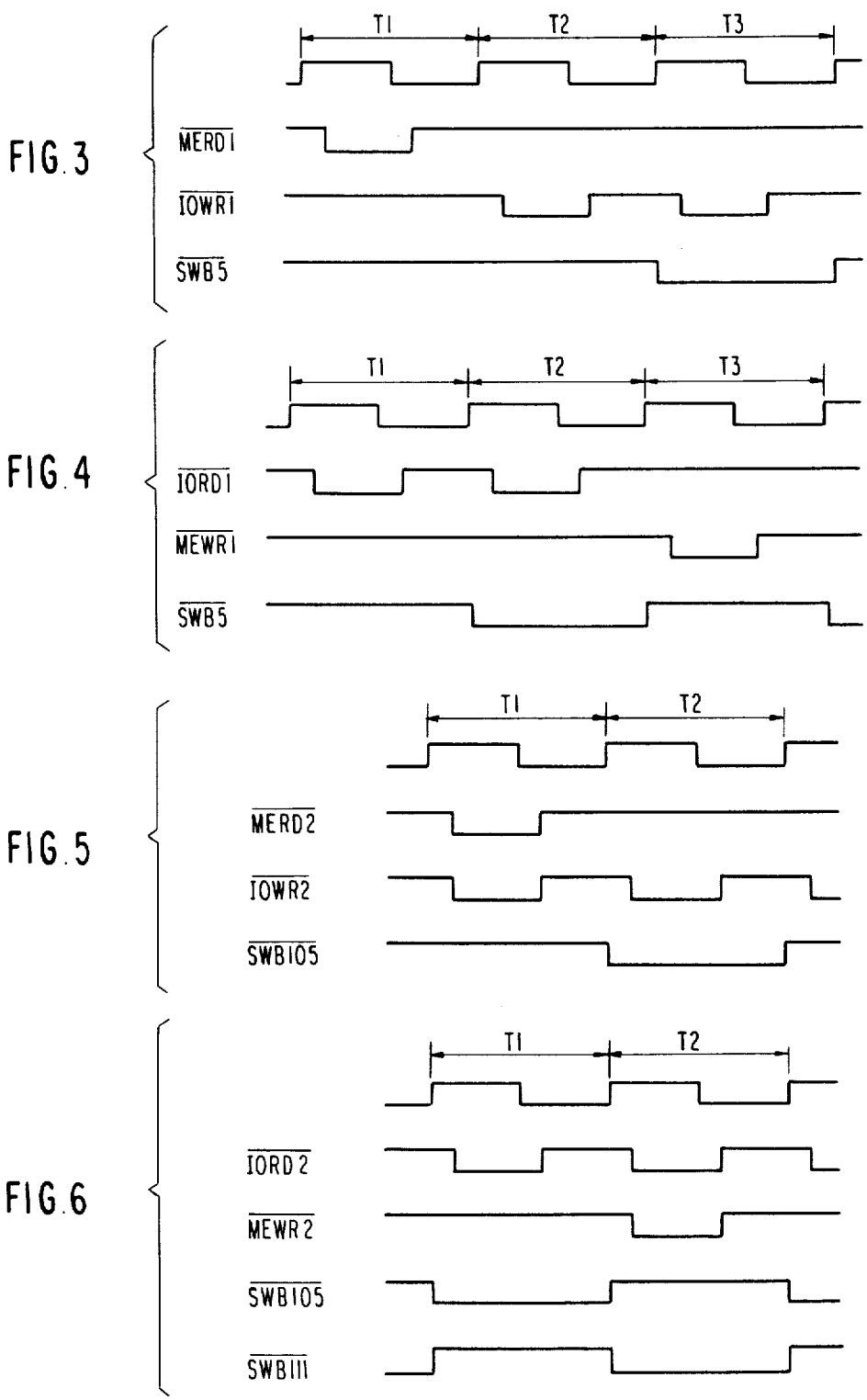

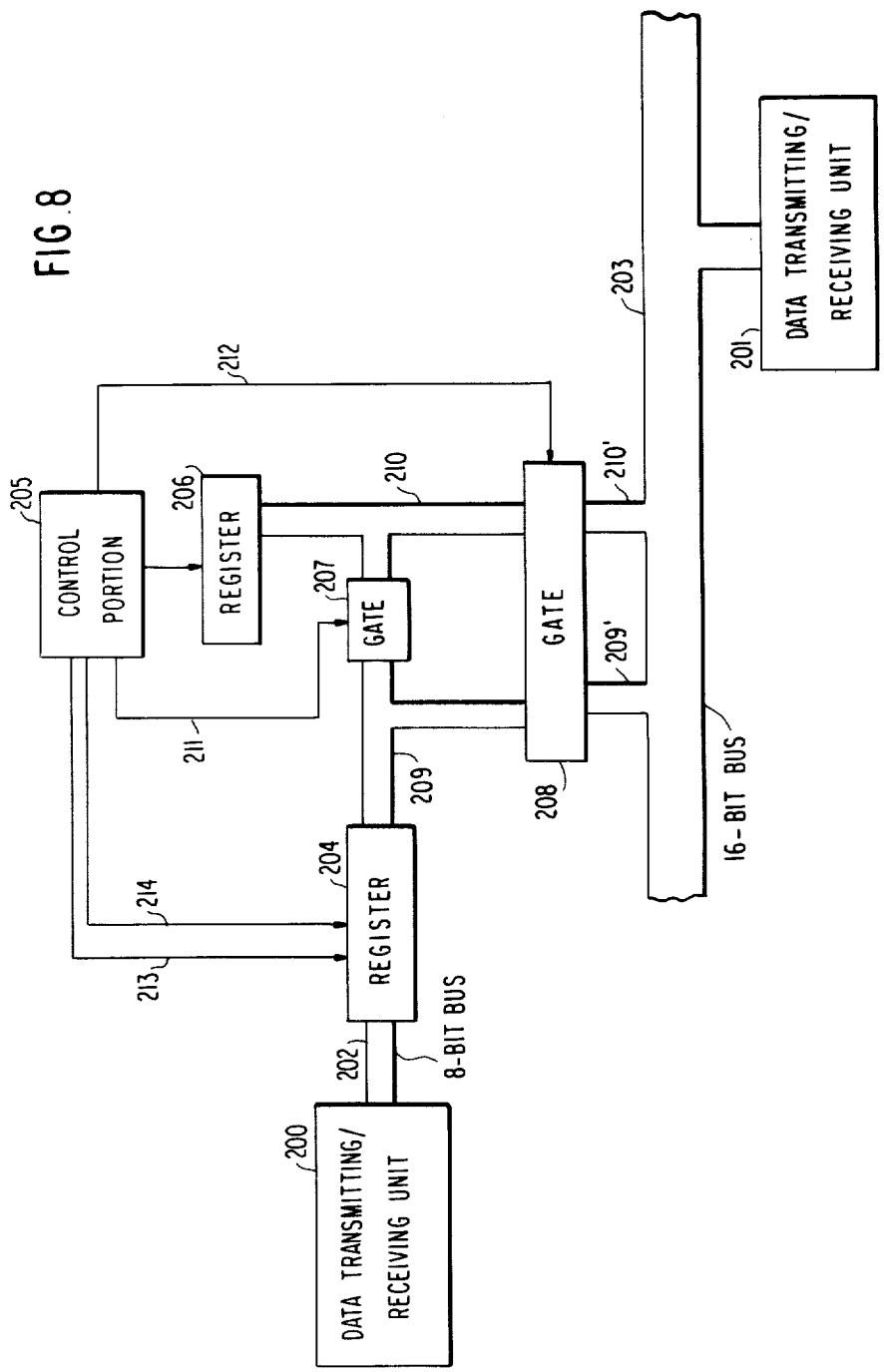

INFORMATION TRANSFERRING APPARATUS

The present invention relates to an information transferring apparatus and, more particularly, to an information transferring apparatus with a control unit for designating the direction of an information transfer and for transferring information between one unit and another unit through information bus lines.

In a computer system, handling for transferring information has to be executed between a memory and a processor, between a memory and an input/output controller, between a processor and an input/output controller, and between one memory and another memory. Further, in a multi-processing system, information transfer between one processor and another processor is necessary.

Generally, information manipulated in these systems are digital data. A unit of manipulation in the system is a plurality of bits, i.e. 8 bits, 16 bits, 132 bits, etc., and therefore, a plurality of bits which form one data word are simultaneously transferred from one device (for example, a memory) to another device (for example, an input/output controller). However, the unit of manipulation in each device is not the same in a word length. In a typical case, a memory device is a 16-bit unit, and an input/output device is an 8-bit unit. Therefore, data transfer between the memory device and the input/output device is very complex and needs a very long period.

The data transfer for transferring the data stored in the memory to the output device or for loading the data applied from the input device into the memory, generally is performed through the execution of a data transfer instruction by a central processing unit (CPU). In this case, the transferred data is transferred via the CPU to a desired device. This method is not problematic when the operation speed of the input/output device is satisfactorily slower than the instruction execution speed of the CPU, but for the input/output device to transmit and receive at a high speed, frequently fails to follow the operation of the input/output device when the data is transferred through the CPU. To cope with this problem, a direct memory access (DMA) transfer has been proposed in which data is directly transferred between the memory and the input/output device, not through the CPU. The DMA transfer system is so designed that in a DMA transfer mode, the CPU allots necessary buses for the DMA transfer, while the execution of the instruction by the CPU itself ceases until the end of the DMA transfer. A DMA control unit used as a control system in the DMA transfer mode supervises memory addresses or the number of the transfer data in the DMA data transfer to control the read out and writing of data to and from the memory and the input/output control device which controls data transfer to a peripheral device (a display unit, printer unit, disk unit, etc.). A unit of the data manipulated in the input/output device is frequently made up of 8 bits. In a microcomputer system using a CPU with a 16-bit word length, the memory and the buses are constructed to operate with a 16-bit unit of data, from the viewpoint of performance and processing efficiency. For the DMA transfer between two units operable with different word lengths, such as a memory of 16-bit length and an input/output device of 8-bit length, the prior art needs at least three cycles. The first cycle is a cycle to fetch 16 bits of data in a register of the DMA control unit. In a second cycle, the upper 8 bits of data is transferred. In a third cycle, transfer of the lower 8 bits of data is done.

Therefore, transfer speed is very slow, even if the DMA control unit is used instead of the CPU. Further, as the CPU stops its operation during a DMA transfer period, the operation period of the CPU also becomes long according to the slow DMA transfer.

An object of the present invention is to provide an information transferring apparatus which improves the utilization efficiency of the buses and particularly has a control function for transferring data at a high speed between the transmitting and receiving devices.

According to the present invention, there is provided an information transferring apparatus comprising memory means for storing first data of n-bit length transferred from a transmitting section, means for transferring second data of m-bit length transferred from the transmitting section and which follows the first data, to a data transfer path of a (m+n)-bit length, and means for transferring the first data stored in the memory means to the data transfer path simultaneously with the second data. The second data is transferred to the data transfer path without being temporarily stored in the memory means, unlike the first data.

The apparatus of the present invention needs only two cycles to transfer the data between a device of m-bit length and a device of (m+a)-bit length. As a result, a high-speed transfer will be obtained in a data handling system. When the present invention is applied to the DMA control system, as one example, the wait period of the CPU becomes very short.

The DMA control system is, generally, adapted to drive a peripheral unit, such as a disk unit, a display unit, or the like, which is desired to be driven with a high speed. The present invention satisfies enough this desire, and is able to be adapted to the multiprocessing system and computer system.

The foregoing and other objectives, features and advantages of the invention will be more readily understood upon consideration of the following detailed description of certain preferred embodiments of the invention, taken in conjunction with the accompanying drawings.

FIGS. 3 and 4 are operation timing diagrams for prior art of FIG. 1;

FIGS. 5 and 6 are operation timing diagrams for the apparatus shown in FIG. 2;

FIG. 8 is a block diagram of another embodiment of an information transferring apparatus according to the present invention.

As above mentioned, the DMA control unit is used to transfer data between a memory and an input/output controller coupled to a peripheral unit, such as a CRT display unit, a printer, or the like. In this case, the DMA control unit couples or separates data for the DMA transfer control, through an operation as will be given below. The operation of a prior DMA control unit will be described referring to the accompanying drawings.

Figure 1:
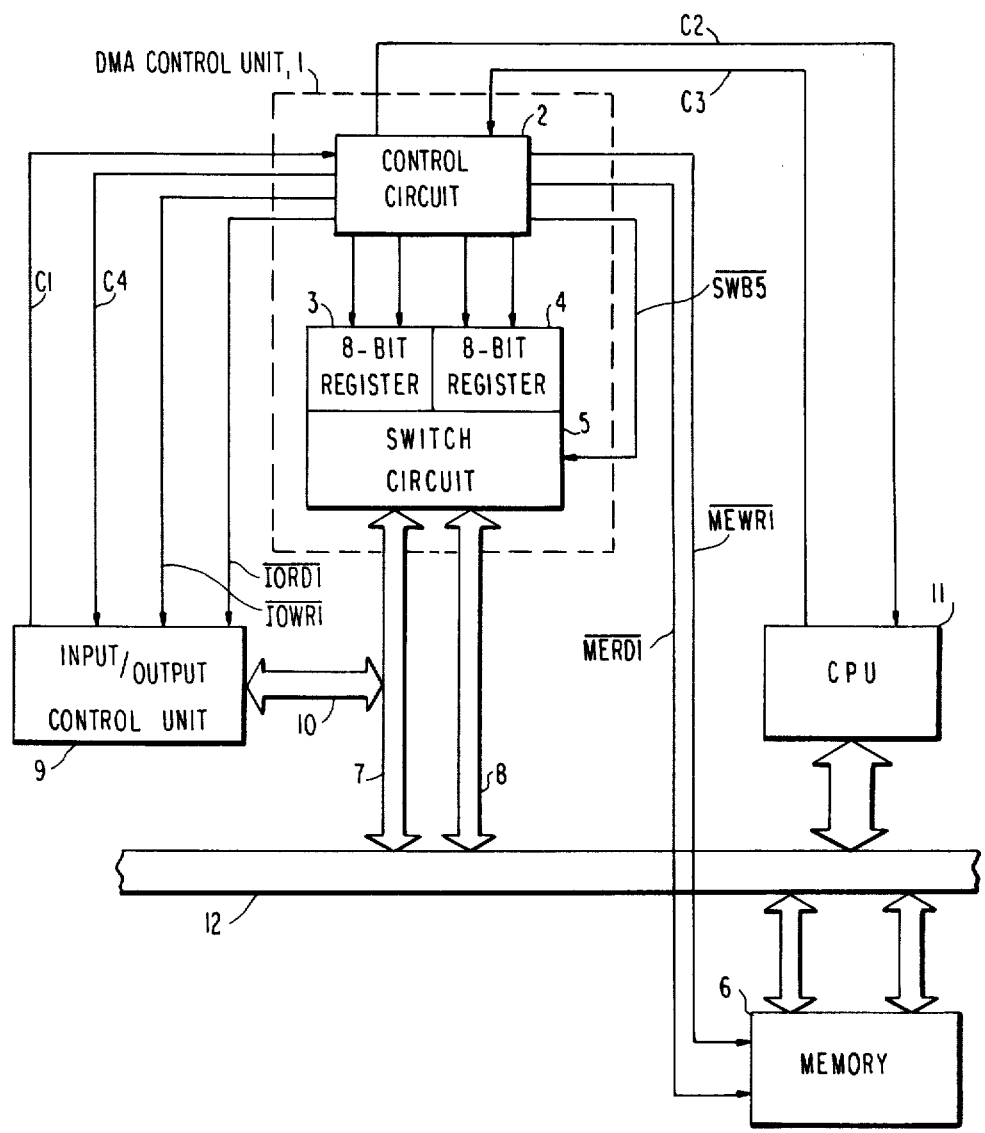
FIG. 1 is a block diagram of a prior data transferring apparatus with a DMA control function.

FIG. 1 shows a block diagram of a data transfer system including a prior DMA control unit and its peripheral device. Now, the unit of manipulated data of a memory 6 is 16 bits, on the other hand the unit of manipulated data of an input/output control unit 9 is 8 bits. The DMA control unit 1 corresponds to the portion enclosed by a dotted line, comprises a control circuit 2, 8-bit registers 3 and 4, and a switch circuit 5 for switching a data transfer bus by a control signal from the control circuit 2. An 8-bit data bus 7, through which 8-bit data words of even addresses in memory 6 pass, and an 8-bit data bus 8, through which 8-bit data words of odd addresses pass, are connected to the switch circuit 5. Further, an input/output control unit 9 and the data bus 7 are interconnected by an 8-bit data bus 10. For the DMA transfer, the CPU 11 sets in the DMA control unit 1 the leading address of memory 6 for a data transfer and information, such as the number of the transferred data. Therefore, the DMA control unit, further, includes an address register in which the leading address is stored, and a counter to count the number of the transferred data. Then, a DMA transfer request signal $C_1$ is transferred from the input/output control unit 9 to the DMA control unit 1. Upon receipt of the signal $C_1$, the control circuit 2 sends a request signal $C_2$ for obtaining the right to control the buses to the CPU 11. When a permission signal $C_3$ for said request signal $C_2$ is transferred from the CPU 11 to the control circuit 2, the control circuit 2 sends an acknowledge signal $C_4$ for the DMA transfer request to the input/output control unit 9. Two subsequent operations may follow; one is to transfer the data from the memory 6 to the input/output control unit 9, and the other is to transfer the data from the input/output control unit 9 to the memory 6. The former operation will first be given.

FIG. 3 shows timing diagrams for the former case when the data is transferred from the memory 6 to the input/output control unit 9. An $\overline{MERD1}$ is a read out signal from the control circuit 2 to the memory 6. When the signal is at a low level, the contents of the memory 6 are produced onto a bus 12. An $\overline{IOWR1}$ is a write signal from the control circuit 2 to the input/output control unit 9. The data on bus 10 is loaded into the input/output control unit 9 when the signal is at the low level. An SWB5 is a control signal sent from the control circuit 2 to the switch circuit 5, and buses 7 and 8 are switched when the signal is low level.

In a first cycle $T_1$, the control circuit 2 sends a read out signal (MERD1) of data toward the memory 6. Then, an 8-bit data of a 16-bit data addressed in an even address of the memory 6 passes through the buses 12 and 7 to register 3 for its storage, and an 8-bit data at an odd address passes through the buses 12 and 8 to a register 4 for its storage.

In a second cycle ($T_2$), the contents of the register 3 are sent to the bus and the control circuit 2 produces a first control signal (IOWR1) to load the data from the bus to the input/output control unit 9. As a result, the 8-bit data at an even address of the memory 6, which has been stored in the register 3, is then loaded into the input/output control unit 9 by way of the buses 7 and 10.

In a third cycle ($T_3$), the contents of the register 4 are sent to the bus, and the control circuit 2 sends to the switch circuit 5 a control signal (SWB5) for switching the data buses 7 and 8, and further sends a second control signal (IOWR1) for loading the data from the bus to the input/output control unit 9. As a result, the 8-bit data in an odd address in the memory 6, which has been stored in the register 4, is loaded into the input/output control unit 9 through the buses 7 and 10. Accordingly, the above case needs three bus cycles.

The operation of the latter case will be given, i.e. the transfer of data from unit 9 to memory 6.

FIG. 4 shows timing diagrams when the data is transferred from the input/output control unit 9 to the memory 6. An $\overline{IORD1}$ is a read out signal sent from the control circuit 2 to the input/output control unit 9. The data in the input/output control unit 9 is produced when the signal is at a low level. An $\overline{MEWR1}$ is a write signal sent from the control circuit 2 to the memory 6, and the data on the bus is loaded into the memory 6 when it is at the low level.

In a first cycle ($T_1$), the control circuit 2 sends a control signal ($\overline{IORD1}$), for coupling the 8-bit data in the input/output control unit 9 with the bus 10, toward the input/output control unit 9. As a result, the input/output control unit 9 loads the 8-bit data to be written into an even address of the memory 6 into the register 3 through the buses 10 and 7.

In a second cycle ($T_2$), the control circuit 2 sends a control signal ($\overline{SWB5}$) for switching the data buses 7 and 8 to the switch circuit 5, and produces a control signal ($\overline{IORD1}$) for applying the 8-bit data newly loaded into the input/output control unit 9 to the bus 10. Consequently, the 8-bit data to be written from the input/output control unit 9 to an odd address of memory 6 is stored in the register 4 by way of the buses 10 and 7.

In a third cycle ($T_3$), the control circuit 2 produces a control signal (MEWR1) for writing the contents on the bus into a specified address of memory 6. As a result, the 8-bit data stored in the register 3 is loaded into an even address of the memory 6, and the 8-bit data stored in the register 4 is loaded into an odd address of memory 6. The writing operations of the data are concurrently performed. Accordingly, the case of the 16-bit data DMA transfer from the input/output control unit 9 to the memory 6 needs three bus cycles, too.

As described above, the prior DMA transfer system has the drawback that the data transfer speed is extremely decreased when the width (the number of bits) of the data bus connected to the input/output control unit is different from the number of bits making up each of the words in the memory.

One embodiment of the present invention will be described referring to the drawings.

Figure 2:
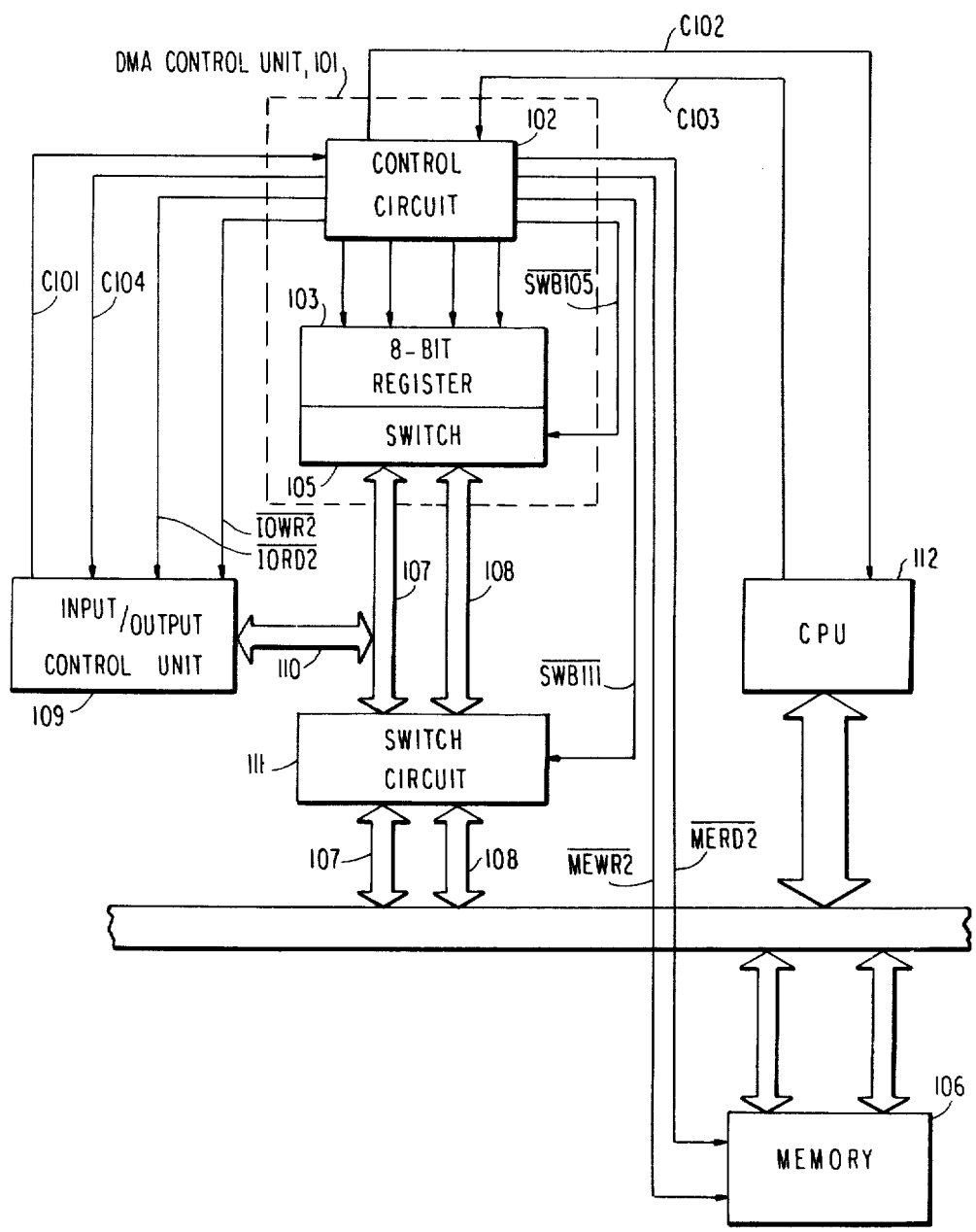
FIG. 2 is a block diagram of a data transferring apparatus with a DMA transfer function, which is an embodiment of the present invention.

FIG. 2 shows a block diagram of an essential part of a data transfer system according to an embodiment of the present invention. The DMA control unit 101 is shown by the portion enclosed by a dotted line. The DMA control unit includes a control circuit 102, an 8-bit register 103, and a switch 105 for switching a bus by a control signal from the control circuit 102. The 8-bit data buses 107 and 108 through which the 8-bit data in the even and odd addresses in the memory 106 pass are coupled to the switch circuit 105. The input/output control unit 109 and the data bus 107 are connected to each other by an 8-bit data bus 110. Further, a switch circuit 111 for switching the data buses 107 and 108 is inserted in the data buses 107 and 108. One set of 8-bits of a 16-bit data bus 113 connected to both the memory 106 and a CPU 112 are connected to the data bus 107, while the remaining 8-bits are connected to the bus 108.

The DMA transfer operation will be described in detail. For starting the DMA transfer, the CPU 112 sets a leading address of the memory 106 regarding the transfer data and the number of the addresses into the DMA control unit 101. As the next step, a DMA transfer request signal $C_{101}$ is sent from the input/output control unit 109 to the DMA control unit 101. Upon receipt of this signal, the control circuit 102 sends a request signal $C_{102}$ for obtaining from the CPU 112 the right to control bus 113. Then, when a permission signal $C_{103}$ for said request signal is returned from the CPU 112 to the control circuit 102, the control circuit 102 sends an acknowledge signal $C_{104}$ for the DMA transfer request to the input/output control unit 109. For setting the data in the DMA control unit 101, the data to determine a data transfer direction is used.

The operation for transfer of 16-bit data from the memory 106 to the input/output control unit 109 will be described.

FIG. 5 shows timing diagrams when the data is transferred from the memory 106 to the input/output control unit 109. An $\overline{\text{MERD2}}$ is a read out signal sent from the control circuit 102 to the memory 106. The contents of the memory 106 are applied to a bus 113 when the signal is at the low level. An $\overline{\text{IOWR2}}$ is a write signal sent from the control circuit 102 to the input/output control unit 109. Data on a bus is loaded into the input/output control unit 109 when the signal is at low level. An $\overline{\text{SWB105}}$ is a control signal sent from the control circuit 102 to the switch circuit 105, and the buses 107 and 108 are switched when the control signal is at low level.

In a first cycle (T1), the control circuit 102 produces a read out signal ($\overline{\text{MERD2}}$) of data which is at a specified address in the memory 106. At the same time, a control signal ($\overline{\text{IOWR2}}$) for writing the contents of the bus 110 is applied to the input/output control unit 109, too. As a result, of the 16-bit data to be transferred to the input/output control unit, the 8-bit data in the even address location is loaded into the input/output control unit 109 through the buses 107 and 110, and the 8-bit data of the odd address location is stored in the register 103 by way of the bus 108.

In a second cycle (T2), the control circuit 102 sends a control signal ($\overline{\text{SWB105}}$) for switching the data buses 107 and 108 to the switch circuit 105. Further, the control circuit 102 simultaneously produces a control signal ($\overline{\text{IOWR2}}$) for loading the data on the bus 110 for transmission to the input/output control unit 109. As a result, the 8-bit data in the odd address in the memory 106, which has been stored in the register 103, is loaded into the input/output control unit 109 through the buses 107 and 110. Accordingly, the 16-bit data is transferred during only two bus cycles.

The operation of transferring the 16-bit data from the input/output control unit 109 to the memory 106 will be described.

FIG. 6 shows brief timing diagrams when the data is transferred from the input/output control unit 109 to the memory 106. An IORD2 is a read out signal sent from the control circuit 102 to the input/output control unit 109, and the data in the input/output control unit 109 is transferred to the bus 107 when the signal is at low level. An MEWR2 is a write signal sent from the control circuit 102 to the memory 106. When the signal is at low level, the data on the bus 113 is written into the memory 106. An SWB111 is a signal sent from the control circuit 102 to the switch circuit 111, and the buses 107 and 108 are switched when the signal is at low level.

In a first bus cycle (T1), the control circuit 102 produces for transmission to the switch circuit 105 a control signal (SWB105) for switching the data buses 107 and 108, and sends to the input/output control circuit 109 a control signal (IORD2) for applying 8-bit data to the bus 110. As a result, the 8-bit data to be written into the even address of memory 106 passes through the buses 110 and 107, and is stored in the register 103 through the switching circuit 105.

In a second bus cycle (T2), the control circuit 102 produces for transmission to the switch circuit 111 a control signal (SWB111) for switching the data buses 107 and 108, and produces for transmission to the input/output control unit 109 a control signal (IORD2) for applying 8-bit data in the input/output control unit 109 to the bus 110. At the same time, the control circuit 102 produces a control signal (MEWR2) for writing the contents of the bus 113 into a specified address (the leading address) of the memory 106. As a result, the 8-bit data stored in the register 103 is written into an even address of the memory 106 through the bus 108 by the switch circuit 111. The 8-bit data in the input/output control unit 109 is written into an odd address of the memory 106 through the buses 110 and 108 by the switch circuit 111. These writing operations of the data are concurrently performed. Accordingly, it is possible to transfer the 16-bit data from the input/output control unit 109 to the memory 106 in only two bus cycles.

Figure 7:
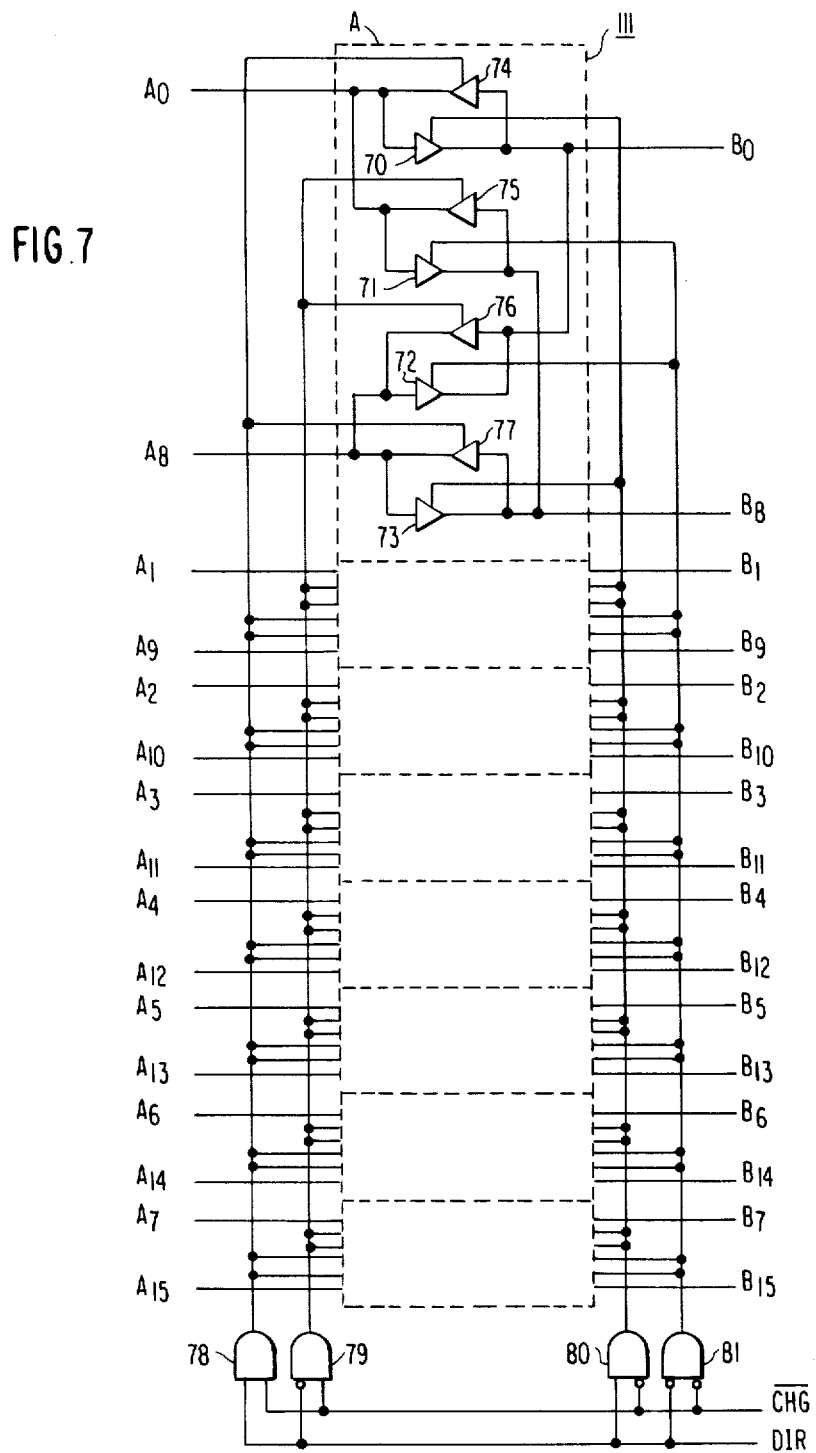
FIG. 7 is a logic circuit diagram of an embodiment of a switch circuit used in the present embodiment.

One embodiment of a detailed logic circuit of the switch circuit 111 will be described referring to the FIG. 7. In FIG. 7, the bit lines corresponding to the 8-bit bus 107 in FIG. 2 are designated by $A_0$ to $A_7$, and the bit lines corresponding to the 8-bit bus 108 are designated by $A_8$ to $A_{15}$. Further, the 16-bit bus 113 connected to the memory 106 is illustrated by the bit lines $B_0$ to $B_{15}$. The switch circuit 111 includes eight logic blocks, and each block is connected to groups of the bit lines ($A_0$, $A_8$, $B_0$, $B_8$), ($A_1$, $A_9$, $B_1$, $B_9$), ... ($A_7$, $A_{15}$, $B_7$, $B_{15}$). For simplicity, a block A including one group of bit lines ($A_0$, $A_8$, $B_0$, $B_8$) will be described. The block A includes 8 buffers; buffers 70 and 71 which are connected at the input to one bit line $A_0$ of the bus 107, buffers 72 and 73 which are connected at the input to one bit line $A_8$ of the bus 108, buffers 74 and 76 which are connected at the input to one bit line $B_0$ of the bus 113, and buffers 75 and 77 which are connected at the input to another bit line $B_8$ of the bus 113. The outputs of the buffers 74 and 75 are connected to the bit line $A_0$; the outputs of the buffers 76 and 77 are connected to the bit line $A_8$; the outputs of the buffers 70 and 72 are connected to the bit line $B_0$; the outputs of the buffers 71 and 73 are connected to the bit line $B_8$. The operation of each buffer (i.e. instructing conduction of the buffer) is properly selected in accordance with signal states of a switch signal (CHG) and a direction indication signal (DIR) from the control circuit 102. With the provision of the AND gates, signal flows as shown by the table given below are determined in accordance with a combination of signal states of the two control signals CHG and DIR.

TABLE 1

| | | DIR | | | |
|---|---|---|---|---|---|
| | | 0 | | 1 | |
| CHG | 0 | $A_0$ | $B_8$ | $A_0$ | $B_0$ |
| | | $A_8$ | $B_0$ | $A_8$ | $B_8$ |
| | 1 | $B_0$ | $A_8$ | $B_0$ | $A_0$ |
| | | $B_8$ | $A_0$ | $B_8$ | $A_8$ |

As seen from table 1, data can be transferred from the input/output control unit 109 to the memory 106 and in the inverse direction. Since the data flow can be controlled by properly combining the bit lines, the transfer order of the upper and lower eight bits of the 16 bits data can also be controlled properly. This feature is very useful for a data handling system (e.g. a CPU for 16 or 8 bits processing), because the order of the transfer data transferred or to be transferred in a divided fashion can be correctly arranged.

As described above, according to the present embodiment, the utilization efficiency of the data buses is improved over the prior art system, and the period required for the data transfer can be reduced by 30% or so. Therefore, a high speed DMA transfer can be realized with a simple circuit arrangement.

The above-mentioned embodiment relates to a DMA control system for transferring 16-bit data between the input/output control unit handling data with a data unit of 8 bits and the memory for storing the data with a data unit of 16 bits. It is evident that the present invention is applicable for the case where data of 2 m bits is transferred between the input/output unit handling the data of an m-bit data unit and a memory for storing the data of a 2 m-bit data unit.

Moreover, according to the present invention, when the data transfer is performed several times in a data division manner, the data transfer speed can be made high. In addition to the above-mentioned circuit arrangement, another circuit arrangement as shown in FIG. 8 may be employed. As shown in FIG. 8, the data transfer system includes data transmitting/receiving units 200 and 201 which are connected to an 8-bit bus 202 and a 16-bit bus 203, respectively. The transfer control unit includes an 8-bit register 204 with a data input/output function and a register 206 of an 8-bit length, and gates 207 and 208, and a control portion 205. The control portion 205 may be a CPU. Those components are interconnected to one another by 8-bit buses 209 and 210, as shown. Although the gate 208 may be the switch gate as shown in FIG. 7, it may be so constructed as to interconnect pairs of the buses 209 and 209', and the buses 210 and 210' or disconnect each pair of the buses one from the other. The switch 207 may be a switch having a function for controlling the connection or disconnection of the buses 209 and 210. The bus 209' is connected to the lower 8 bits of the 16 bit bus 203, and the bus 210' is connected to the upper 8 bits. The switching operations of the gates 207 and 208 are determined by directing signals 211 and 212 derived from the control portion 205. The data read out and writing operations of the register 204 for applying the fetching 8-bit data to and from the data transmitting/receiving unit 200 are controlled by a write signal on line 213 and a read out signal on line 214 produced from the control portion 205. Of course, the data transmitting/receiving units 200 and 201 are operable merely as a data transmitting unit or a data receiving unit.

When data of a 16-bit length is transferred from the unit 200 to the unit 201, the unit 200 divides the data into two segments each of 8 bits and transfers the divided data segments two times. In this case, the first 8-bit data is set in the register 204. Then, the control portion 205 enables the gate 207 to interconnect the buses 209 and 210 so as to allow the data to be set in the register 206. As a result, in a first bus cycle, the first 8 bits data is set in the register 206. In a second bus cycle, the control portion 205 disables the gate 207 to separate the bus 209 from the bus 210. Further, the control portion 205 enables the gate 208, which has been disabled, to connect the pair of the buses 209 and 209' and the pair of the buses 210 and 210'. At this time, the second half 8-bit data of the 16-bit data is newly set in the register 204, so that the data is transferred to the lower 8-bit bus of the 16-bit bus 203 through the route of bus 209-gate 208-bus 209'. At the same time, the first 8-bit data, which has been set in the register 206, is also transferred to the upper 8-bit bus of the 16-bit bus 203, through the route of bus 210-gate 208-bus 210'. As a result, the data with a 16-bit length can be transferred to the unit 201 as the receiving section during two bus cycles.

The transfer of the data of the 16-bit length from the unit 201 to the unit 200 will be described. In this case, the unit 201 directly reads out the data of the 16-bit length onto the bus 203. At this time, if the gate 208 is enabled and the gate 207 is disabled, the data transferred onto the buses 209' and 210' are stored in the registers 204 and 206, respectively. In the second bus cycle, if the gate 208 is disabled and the gate 207 is enabled, the 8-bit data stored in the register 206 is transferred to the register 204. In this way, the two data, each of 8 bits, can be transferred to the unit 200 in two bus cycles.

As seen from the foregoing, the arrangement of the present embodiment can transfer the data with a good bus utilization efficiency and at a very high speed. When the data transferred from the unit 201 to the unit 200 is such that 16 bits make up one data word, the order with respect to the upper 8 bits is inverted. No problem, however, arises from this if a means for inverting the transfer order of data is provided in the unit 200 or between the register 204 and the unit 200. As an extension of this idea, the switch gate shown in FIG. 7 may be used for the gate 208. If the unit 200 is for 8-bit processing, such a consideration is not required.

The present invention is applicable to transferring apparatus for transferring data, instructions and addresses, in addition to the above case. If a plurality of registers are used for the register 103 or 206 in FIG. 2 or 8, the data, divided into more than two data segments can be transferred at a high speed.

What is claimed is:

1. An information transferring apparatus comprising:
a first unit in which m-bit information is manipulated as a unit of handling,
a first bus consisting of m bit signal lines, which is coupled to said first unit,
a second unit in which 2 m-bit information is manipulated as a unit of handling,
a second bus consisting of 2 m bit signal lines, which is coupled to said second unit,
means for temporarily storing m bits of information,
an information transfer circuit for transferring information between said first and second units, and coupled to said first bus, said second bus and said storing means, and
a control circuit for controlling said information transfer circuit, and coupled to said first unit, said second unit, said storing means and said information transfer circuit, said control unit designating said second unit to send out 2 m-bit information to said second bus and controlling said information transfer circuit such that first m bits of said 2 m-bit information on said second bus are transferred to said storing means to be stored therein and at the same time the remaining m bits of said 2 m-bit information on said second bus are transferred via said first bus to said first unit and, thereafter, the stored m bits of information in said storing means are transferred via said first bus to said first unit, and said control unit designating said first unit to send out at least twice m-bit information to said first bus and controlling said information transfer circuit such that first m-bit information on said first bus is stored in said storing means, followed by transfer of the next m-bit information on said first bus via said second bus to said second unit and at the same time by transfer of the stored m-bit information from said storing means via said second bus to said second unit.

2. The apparatus as claimed in claim 1, in which only two bus cycles are required for 2 m-bit information transfer from said first unit to said second unit, the first cycle is a bus cycle in which the leading m bits of information are stored in said storing means, and in a second bus cycle, said leading m bits information in said storing means and following m bits information read out from said first unit are simultaneously transferred to said second unit through said second bus.

3. The apparatus as claimed in claim 1, in which only two bus cycles are required for 2 m-bit information transfer from said second unit to said first unit, in a first bus cycle m bits of information of said 2 m-bit information are stored in said storing means when the remaining m bits of information are transferred to said first unit through said second and first buses, and in a second bus cycle said m bits of information stored in said storing means are transferred to said first unit through said first bus.

4. A data handling apparatus comprising memory means for storing first data transferred from a transmitting section, means for transferring to a receiving section second data which follows said first data and is read out from said transmitting section, and means for transferring said first data stored in said memory means to said receiving section at the same time that said second data is transferred to said receiving section.

5. A data handling apparatus comprising first control circuit means for simultaneously reading out a plurality of data from a transmitting section, second control circuit means for temporarily storing one part of said plurality of data in a register and for writing the remaining part of said plurality of data in a receiving section, and third control circuit means for writing said one part stored in said register in said receiving section after a writing operation of said remaining part to said receiving section.

6. An apparatus having a direct memory access function comprising a memory unit for storing data of $(m+n)$-bit length in each memory location, an input/output control unit which separately manipulates first data of m-bit length and second data of n-bit length, a direct memory access circuit for transferring data between said memory unit and said input/output control unit, a register for temporarily storing said first data, a first bus with $(m+n)$-bit lines coupled to said memory unit and said direct memory access circuit, and a second bus with m-bit lines coupled to said direct memory access circuit and said input/output control unit, said $(m+n)$-bit length data being read out simultaneously from said memory unit to said first bus, first data with m-bit length of said $(m+n)$-bit length data being stored in said register when second data with n-bit length of said $(m+n)$ bit length data is transferred to said input/output control unit under control of said direct memory access circuit, and said first data stored in said register being transferred to said input/output control unit after said second data is received by said input/output control unit.

* * * * *

UNITED STATES PATENT AND TRADEMARK OFFICE
CERTIFICATE OF CORRECTION

PATENT NO. : 4,467,447

DATED : August 21, 1984

INVENTOR(S) : Takahashi et al

It is certified that error appears in the above-identified patent and that said Letters Patent is hereby corrected as shown below:

Column 3, line 4, insert --and-- before "comprises".

Signed and Sealed this

Thirtieth Day of April 1985

[SEAL]

Attest:

DONALD J. QUIGG

Attesting Officer     Acting Commissioner of Patents and Trademarks